United States Patent
Lee et al.

(10) Patent No.: US 11,861,066 B2
(45) Date of Patent: Jan. 2, 2024

(54) COMPUTER SYSTEM FOR PROVIDING TACTILE INTERFACE FOR REAL-TIME TWO-DIMENSIONAL TACTILE INPUT/OUTPUT INTERACTION OF VISUALLY IMPAIRED PEOPLE, AND OPERATING METHOD THEREOF

(71) Applicant: Korea Advanced Institute of Science and Technology, Daejeon (KR)

(72) Inventors: Geehyuk Lee, Daejeon (KR); Jingun Jung, Daejeon (KR); Sunmin Son, Daejeon (KR); Sangyoon Lee, Daejeon (KR); Yeonsu Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 74 days.

(21) Appl. No.: 17/687,011

(22) Filed: Mar. 4, 2022

(65) Prior Publication Data

US 2022/0291749 A1    Sep. 15, 2022

(30) Foreign Application Priority Data

Mar. 15, 2021  (KR) .......... 10-2021-0033518
Nov. 29, 2021  (KR) .......... 10-2021-0166614

(51) Int. Cl.
G06F 3/01    (2006.01)
G09B 21/00   (2006.01)

(52) U.S. Cl.
CPC .......... G06F 3/016 (2013.01); G09B 21/004 (2013.01)

(58) Field of Classification Search
CPC ....... G06F 3/016; G06F 3/014; G09B 21/004; G09B 21/002
See application file for complete search history.

(56) References Cited

U.S. PATENT DOCUMENTS

| | | | |
|---|---|---|---|
| 7,245,292 B1* | 7/2007 | Custy ............. | G06F 3/016 345/173 |
| 11,249,601 B2* | 2/2022 | Yamamoto ...... | G06F 3/014 |
| 2016/0127624 A1* | 5/2016 | Woo ............... | G06F 3/011 348/36 |

* cited by examiner

Primary Examiner — Rodney Amadiz
(74) Attorney, Agent, or Firm — PCFB LLC

(57) ABSTRACT

Provided is a computer system for providing a tactile interface for a real-time two-dimensional (2D) tactile input/output interaction of a visually impaired person and an operating method thereof. The computer system may be configured to generate a tactile output corresponding to 2D visual information for a first body surface of a user through a tactile output module that is in contact with the first body surface, sense a tactile input for a second body surface of the user through a tactile input module, and generate a control signal for the 2D visual information based on the tactile input. Here, one of the first body surface and the second body surface may be a ventral surface of one body portion of the user, and the other one of the first surface and the second body surface may be a dorsal surface corresponding to the ventral surface in the one body portion.

20 Claims, 14 Drawing Sheets

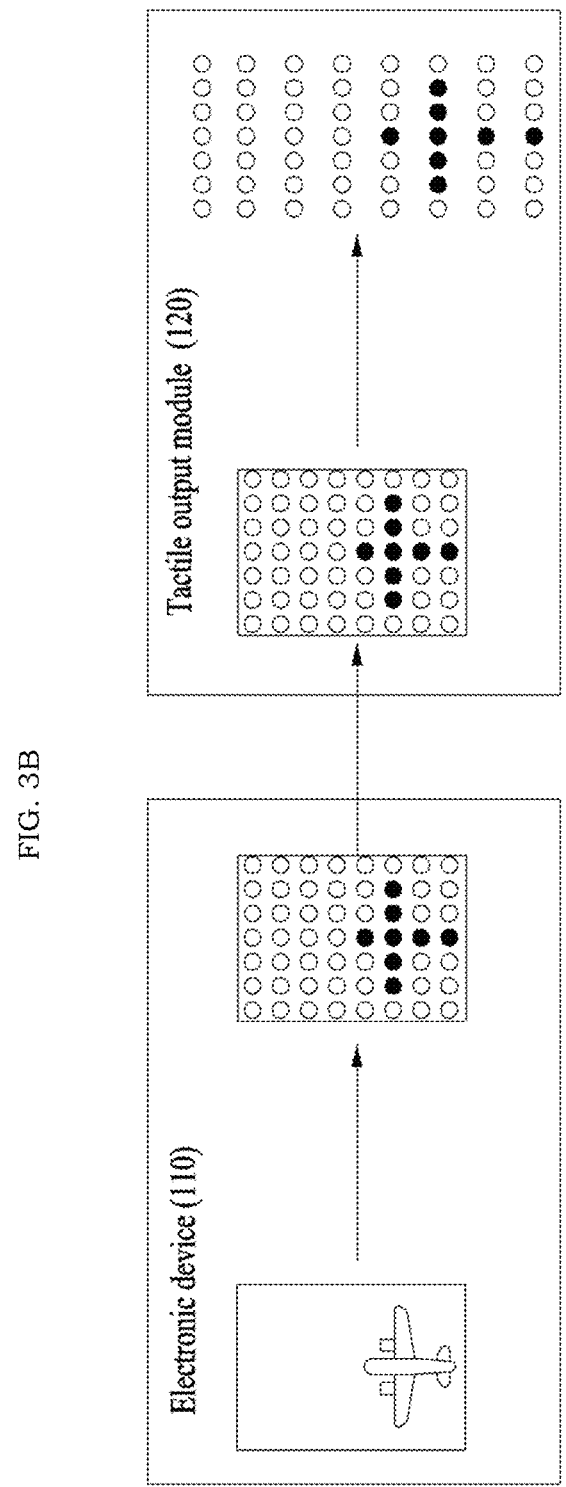

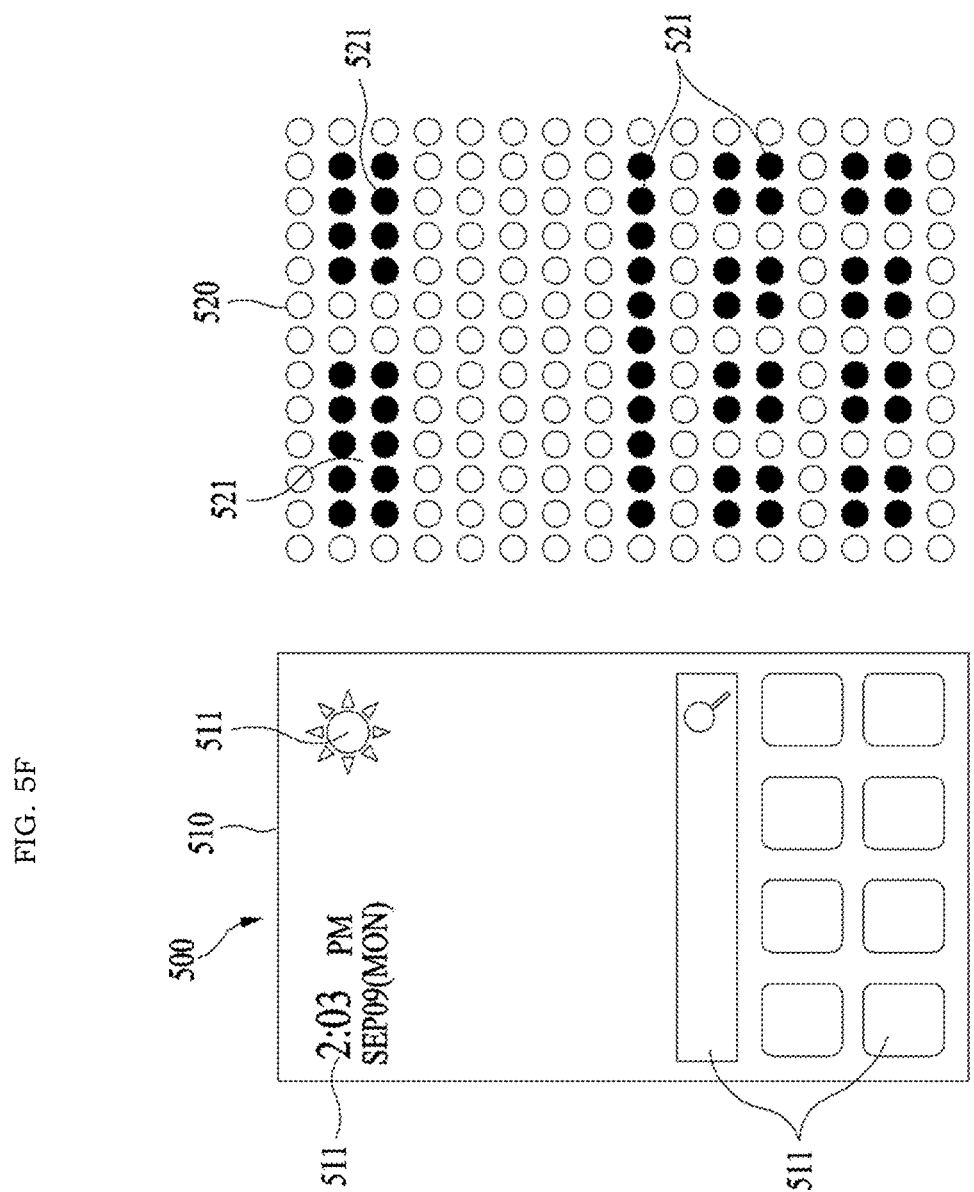

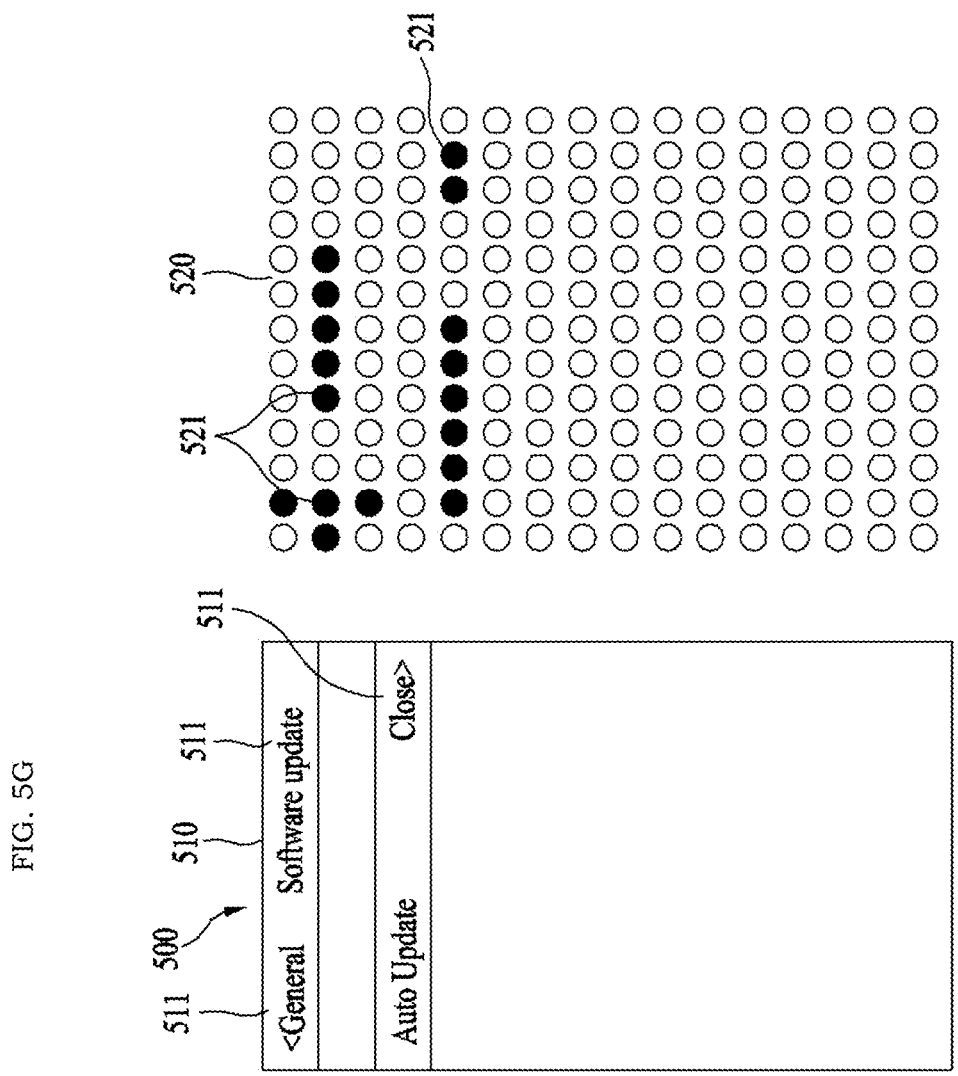

COMPUTER SYSTEM FOR PROVIDING TACTILE INTERFACE FOR REAL-TIME TWO-DIMENSIONAL TACTILE INPUT/OUTPUT INTERACTION OF VISUALLY IMPAIRED PEOPLE, AND OPERATING METHOD THEREOF

CROSS-REFERENCE TO RELATED APPLICATION

This application claims the priority benefit of Korean Patent Application Nos. 10-2021-0033518, filed on Mar. 15, 2021 and 10-2021-0166614, filed on Nov. 29, 2021 in the Korean Intellectual Property Office, the disclosure of each which is incorporated herein by reference in their entirety.

BACKGROUND

1. Field of the Invention

Example embodiments of the following description relate to a computer system for providing a tactile interface for two-dimensional (2D) tactile input/output interaction of a visually impaired person.

2. Description of the Related Art

A non-disabled user may interact with a plurality of objects on a screen while viewing a two-dimensional (2D) screen of a touch screen at a time. On the contrary, to use a touchscreen of a smartphone, a visually impaired person performs a 2-phase interaction using a cursor. A first phase is a search phase. In the search phase, information of objects may be acquired while moving the cursor. The cursor may be moved to select an object by tapping a position of the object with a finger or to sequentially select objects using a gesture. When the cursor selects a new object, information of the object is read loud. By repeating this, the screen is understood by finding a desired target or by collecting information about a plurality of objects. A second phase is an action phase. When the cursor is positioned on a desired object, the cursor activates the object or performs a function of the object by double-tapping the screen.

When using a touchscreen, such a 2-phase interaction structure limits the use of an interactive application. In particular, when moving objects are present in, particularly, a game or a responsive webpage, it is difficult to interact with the moving objects. When a single object moves, it may be unknown until information is acquired by selecting the object again with the cursor. Likewise, even when a new object is created or even when an existing object disappears, a corresponding change may not be immediately noticed.

Another method for a visually impaired person to search for 2D information is a method of using a 2D tactile display. A visually impaired user acquires information by fumbling a display surface with some fingers. However, even though the visually impaired user searches a corresponding region with several fingers, the user may not recognize the entire region at a time. Therefore, when a moving object is present, it may be difficult for the user to notice that the object is moving until the user touches a position of the object, which is similar to a case of the touchscreen. Therefore, similar to a case of using the touchscreen of the smartphone, the 2-phase interaction may be performed.

SUMMARY

Example embodiments provide a computer system for providing a tactile interface for a real-time two-dimensional (2D) tactile input/output interaction of a user, for example, a visually impaired person and an operating method thereof.

Example embodiments provide a computer system for replacing 2D visual information with a tactile stimulation and outputting the same and sensing a tactile input corresponding thereto and an operating method thereof.

Example embodiments provide a computer system that allows a user to cognitively perform a tactile input/output interaction through spatially corresponding body surfaces and an operating method thereof.

According to an aspect of example embodiments, there is provided an operating method of a computer system, the method including generating a tactile output corresponding to 2D visual information for a first body surface of a user through a tactile output module that is in contact with the first body surface; sensing a tactile input for a second body surface of the user through a tactile input module; and generating a control signal for the 2D visual information based on the tactile input.

One of the first body surface and the second body surface may be a ventral surface of one body portion of the user, and the other one of the first body surface and the second body surface may be a dorsal surface corresponding to the ventral surface in the one body portion.

According to an aspect of example embodiments, there is provided a computer system including a tactile output module configured to be in contact with a first body surface of a user and to generate a tactile output corresponding to 2D visual information for the first body surface; a tactile input module configured to sense a tactile input for a second body surface of the user; and a processor configured to generate a control signal for the 2D visual information based on the tactile input.

One of the first body surface and the second body surface may be a ventral surface of one body portion of the user, and the other one of the first body surface and the second body surface may be a dorsal surface corresponding to the ventral surface in the one body portion.

According to some example embodiments, a computer system may provide a tactile interface for a real-time 2D tactile input/output interaction of a user, for example, a visually impaired person. The computer system may replace 2D visual information with a tactile output, that is, a tactile stimulation on a 2D plane and thereby generate the same such that the user may recognize the 2D visual information as a whole at once. Here, the computer system may change the tactile output in real time in response to a real-time change in the 2D visual information. Through this, the user may immediately recognize an object that varies in real-time, for example, a moving object. In addition, the computer system may sense a tactile input corresponding to the tactile output and accordingly, allow the user to perform a tactile input/output interaction in real time. Here, the user may cognitively perform a tactile input/output interaction through body surfaces that spatially correspond to each other, for example, a palmar surface and a dorsal surface of a hand, a sole surface and a top surface of a foot, and a back surface and an abdominal surface.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 3B illustrates an example of the tactile output module of FIG. 1;

FIGS. 5A, 5B, 5C, 5D, 5E, 5F, 5G, and 5H illustrate examples of an operation characteristic of a computer system according to example embodiments.

DETAILED DESCRIPTION

Figure 1:
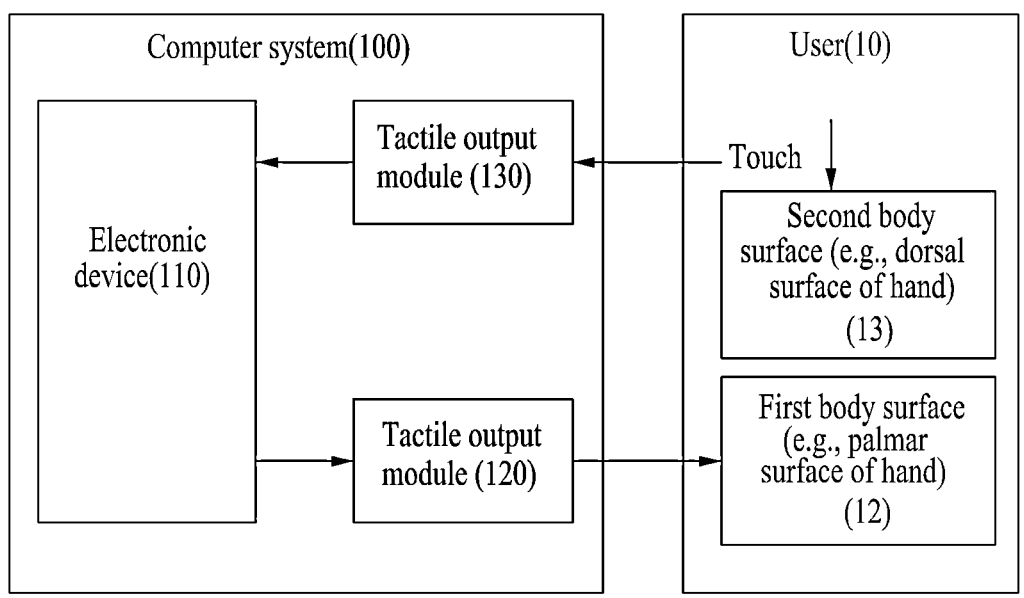
FIG. 1 is a diagram illustrating an example of a computer system according to example embodiments.

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The terminology used herein is for describing various example embodiments only, and is not to be used to limit the disclosure. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component, without departing from the scope of the disclosure.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Hereinafter, the example embodiments are described with reference to the accompanying drawings.

FIG. 1 is a diagram illustrating an example of a computer system 100 according to example embodiments.

Referring to FIG. 1, the computer system 100 according to example embodiments may provide a tactile interface for a real-time two-dimensional (2D) tactile input/output interaction of a user 10, for example, a visually impaired person. To this end, a first body surface 12 and a second body surface 13 may be defined in the user 10. The first body surface 12 and the second body surface 13 may be present on the same body portion or may be present on different body portions, respectively. The first body surface 12 and the second body surface 13 may match and may be separate from each other without being matched. In some example embodiments, the first body surface 12 and the second body surface 13 may be separate from each other on a skin surface that encompasses one body portion and thereby defined, and may be provided to face each other based on a plane present in the middle therebetween. In one example embodiment, the first body surface 12 may be a ventral surface of one body portion and the second body surface 13 may be a dorsal surface corresponding to the ventral surface on the corresponding body portion. For example, the first body surface 12 may be a palmar surface of a hand and the second body surface 13 may be a dorsal surface of the hand. As another example, the first body surface 12 may be a sole surface of a foot and the second body surface 130 may be a top surface of the foot. As another example, the first body surface 12 may be a dorsal surface of one body portion and the second body surface 13 may be a ventral surface corresponding to the dorsal surface in a corresponding body portion. For example, the first body surface 12 may be a back surface and the second body surface 13 may be an abdominal surface. Here, the computer system 100 may generate a tactile output for the first body surface 12 of the user 10 and may sense a tactile input for the second body surface 13 of the user 10.

According to example embodiments, the computer system 100 may include an electronic device 110, a tactile output module 120, and a tactile input module 130. In some example embodiments, at least two of components of the computer system 100 may be implemented as a single integrated circuitry. That is, components of the computer system 100 may be implemented as a single apparatus or may be implemented in a plurality of apparatuses in a distributed manner. In some example embodiments, at least one another component may be added to the computer system 100.

The electronic device 110 may manage 2D visual information. The electronic device 110 may control the 2D visual information. Here, the electronic device 110 may generate a control signal for the 2D visual information based on an input from the user 10. For example, the electronic device 110 may include at least one of a smartphone, a mobile phone, a navigation, a computer, a laptop computer, a digital broadcasting terminal, a personal digital assistant (PDA), a portable multimedia player (PMP), a tablet PC, a game console, a wearable device, an Internet of things (IoT) device, home appliance, a medical device, and a robot.

The tactile output module 120 may generate a tactile output for the first body surface 12 of the user 10. For example, the tactile output may be a tactile stimulation and the tactile stimulation may include at least one of an electrical stimulation, a vibration stimulation, and a pressure stimulation such as a stabbing stimulation. Here, the tactile output module 120 may generate the tactile output for the first body surface 12 based on the 2D visual information. To this end, the tactile output module 120 may be in contact with the first body surface 12. According to an example embodiment, the tactile output module 120 may be implemented in a form of a board or a sheet. According to another example embodiment, the tactile output module 120 may be implemented in a form of a fiber that surrounds a body portion having the first body surface 12.

The tactile input module 130 may sense a tactile input for the second body surface 13 of the user 10. Here, the tactile input module 130 may sense the tactile input based on at least one of a touch input and a hover input from the user 10 for the second body surface 130. The tactile input module 130 may provide tactile information about the tactile input to the electronic device 110. Therefore, the electronic device 110 may generate a control signal for the 2D visual information based on the tactile input. To this end, the tactile input module 130 may be in contact with at least a portion of the second body surface 13 or may be separate from the second body surface 13.

For example, when the first body surface 12 is a palmar surface of a hand and the second body surface 13 is a dorsal surface of the hand, the tactile output module 120 and the tactile input module 130 may be implemented in a form of a glove. As another example, when the first body surface 12 is a sole surface of a foot and the second body surface 130 is a top surface of the foot, the tactile output module 120 and the tactile input module 130 may be implemented in a form of a sock. As another example, when the first body surface 12 is a back surface and the second body surface 13 is an abdominal surface, the tactile output module 120 and the tactile input module 130 may be implemented in a form of a top or an abdominal binder.

Figure 2:
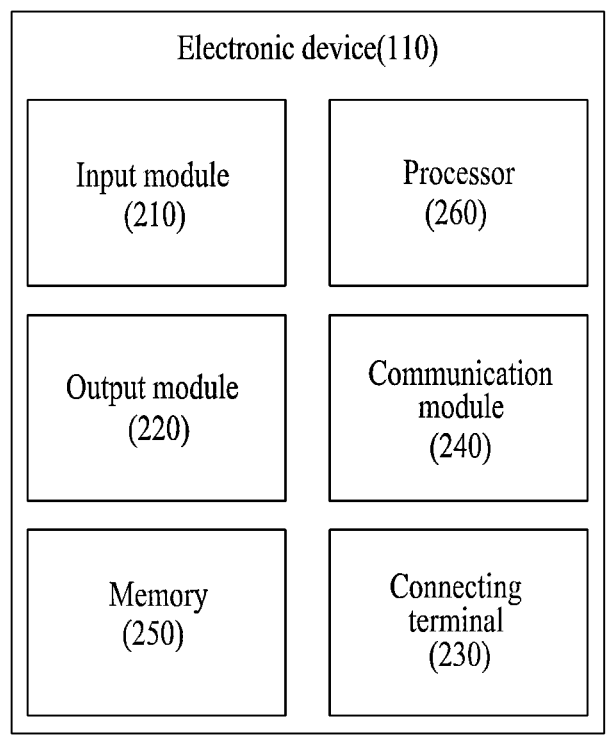
FIG. 2 illustrates an example of an electronic device of FIG. 1.

FIG. 2 illustrates an example of the electronic device 110 of the computer system 100 according to example embodiments.

Referring to FIG. 2, the electronic device 110 according to example embodiments may include at least one of an input module 210, an output module 220, a connecting terminal 230, a communication module 240, a memory 250, and a processor 260. In some example embodiments, at least one of components of the electronic device 110 may be omitted and at least one another component may be added to the electronic device 110. In some example embodiments, at least two of components of the computer system 100 may be implemented as a single integrated circuitry.

The input module 210 may input a signal to be used for at least one component of the electronic device 110. The input module 210 may include at least one of an input device configured to allow the user 10 to directly input a signal to the electronic device 110, and a sensor device configured to sense an ambient change and to generate a signal. For example, the input device may include at least one of a microphone, a mouse, and a keyboard. In an example embodiment, the input device may include at least one of a touch circuitry configured to sense a touch and a sensor circuitry configured to measure strength of a force generated by the touch.

The output module 220 may output information to an outside of the electronic device 110. The output module 220 may include at least one of a display device configured to output 2D visual information and an audio output device configured to output auditory information as an audio signal. For example, the display device may include at least one of a display, a hologram device, and a projector. For example, the display device may be implemented as a touchscreen through assembly to at least one of the touch circuitry and the sensor circuitry of the input module 210. For example, the audio output device may include at least one of a speaker and a receiver.

The connecting terminal 230 may be provided for a physical connection between the electronic device 110 and an external device. According to an example embodiment, the connecting terminal 230 may include a connector. For example, the connecting terminal 230 may include a high-definition multimedia interface (HDMI) connector, a universal serial bus (USB) connector, a secure digital (SD) card connector, and an audio connector. Here, the external device may include another electronic device. In some example embodiments, the other electronic device may include at least one of the tactile output module 120 and the tactile input module 130.

The communication module 240 may communicate with the external device in the electronic device 110. The communication module 240 may establish a communication channel between the electronic device 110 and the external device and may communicate with the external device through the communication channel. Here, the external device may include at least one of a satellite, a base station, a server, and another electronic device. In some example embodiments, the other electronic device may include at least one of the tactile output module 120 and the tactile input module 130. The communication module 240 may include at least one of a wired communication module and a wireless communication module. The wired communication module may be connected to the external device in a wired manner through the connecting module 230 and may communicate with the external device in the wired manner. The wireless communication module may include at least one of a near field communication module and a far field communication module. The near field communication module may communicate with the external device through a near field communication scheme. For example, the near field communication scheme may include at least one of Bluetooth, wireless fidelity (WiFi) direct, and infrared data association (IrDA). Here, the far field communication module may communicate with the external device over a network. For example, the network may include at least one of a cellular network, the Internet, and a computer network such as a local area network (LAN) and a wide area network (WAN).

The memory 250 may store a variety of data used by at least one component of the electronic device 110. For example, the memory 250 may include at least one of a volatile memory and a nonvolatile memory. The data may include at least one program and input data or output data related thereto. A program may be stored as software including at least one instruction in the memory 250 and may include at least one of an operating system (OS), middleware, and an application.

The processor 260 may control at least one component of the electronic device 110 by executing the program of the memory 250. Through this, the processor 260 may perform data processing or an operation. Here, the processor 260 may execute the instruction stored in the memory 250.

According to example embodiments, the processor 260 may manage 2D visual information. Here, the 2D visual information may include at least one object provided on a predetermined visual plane. For example, the visual plane may represent a background screen and the object may include at least one of an icon, a widget, an item, a character, a button, a slider, and a pop-up window as a screen element provided on the background screen. The processor 260 may provide the 2D visual information to the tactile output module 120. To this end, the processor 260 may generate the 2D visual information at a preset resolution. For example, the processor 260 may provide the 2D visual information to the tactile output module 120 while displaying the 2D visual information on the display device of the output module 220.

According to example embodiments, the processor 260 may control 2D visual information. That is, the processor 260 may control the 2D visual information based on an input from the user 10. Here, the processor 260 may generate a control signal for the 2D visual information based on a tactile input sensed by the tactile input module 130. For example, the processor 260 may receive tactile information about the tactile input from the tactile input module 130 and may generate a control signal using the tactile information. The processor 260 may control the 2D visual information according to the control signal. Through this, the processor 260 may modify the 2D visual information. For example, the processor 260 may modify the 2D visual information displayed through the display device of the output module 220.

Figure 3A:
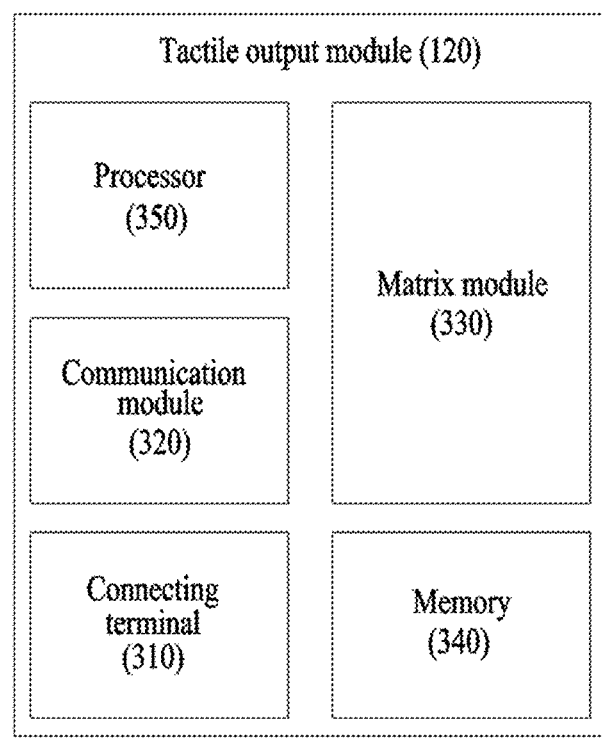
FIG. 3A illustrates an example of a tactile output module of FIG. 1.

FIG. 3A illustrates an example of the tactile output module 120 of the computer system 100 according to example embodiments, and FIG. 3B illustrates an example of the tactile output module 120 of the computer system 100 according to example embodiments.

Referring to FIG. 3A, the tactile output module 120 may include at least one of a connecting terminal 310, a communication module 320, a matrix module 330, a memory 340, and a processor 350. In some example embodiments, at least one of components of the tactile output module 120 may be omitted and at least one another component may be added to the tactile output module 120. In some example embodiments, at least two of the components of the tactile output module 120 may be implemented as a single integrated circuitry. According to an example embodiment, the memory 340 and the processor 350 of the tactile output module 120 may be integrated into the memory 250 and the processor 260 of the electronic device 110, respectively. In this case, the communication module 320 may be directly connected to the matrix module 330. According to another example embodiment, the tactile output module 120 may be implemented as a single device with the electronic device 110. In this case, the connecting terminal 310 and the communication module 320 may be omitted from the tactile output module 120, and the memory 340 and the processor 350 of the tactile output module 120 may be integrated into the memory 250 and the processor 260 of the electronic device 110, respectively.

The connecting terminal 310 may be provided for a physical connection between the tactile output module 120 and an external device. According to an example embodiment, the connecting terminal 310 may include a connector. For example, the connecting terminal 310 may include an HDMI connector or a USB connector. Here, the external device may include at least one of the electronic device 110 and the tactile input module 130.

The communication module 320 may communicate with the external device in the tactile output module 120. The communication module 320 may establish a communication channel between the tactile output module 120 and the external device and may communicate with the external device through the communication channel. Here, the external device may include at least one of the electronic device 110 and the tactile input module 130. The communication module 320 may include at least one of a wired communication module and a wireless communication module. The wired communication module may be connected to the external device in a wired manner through the connecting terminal 310 and may communicate with the external device in the wired manner. The wireless communication module may include at least one of a near field communication module and a far field communication module. The near field communication module may communicate with the external device through a near field communication scheme. For example, the near field communication scheme may include at least one of Bluetooth, WiFi direct, and IrDA. The far field communication module may communicate with the external device through a far field communication scheme. Here, the far field communication module may communicate with the external device over a network. For example, the network may include at least one of a cellular network the Internet, and a computer network such as a LAN and a WAN.

The matrix module 330 may generate a tactile output for the first body surface 12 of the user 10. For example, the tactile output may be a tactile stimulation, and the tactile stimulation may include at least one of an electrical stimulation, a vibration stimulation, and a pressure stimulation such as a stabbing stimulation. To this end, the matrix module 330 may be in contact with the first body surface 12. For example, when the tactile output module 120 is implemented in a form of a glove, the matrix module 330 may be implemented to be in contact with a palm surface of a hand of the user 10 within the glove. As another example, when the tactile output module 120 is implemented in a form of a sock, the matrix module 330 may be implemented to be in contact with a sole surface of a foot of the user 10 within the sock. As another example, when the tactile output module 120 is implemented in a form of a top or an abdominal binder, the matrix module 330 may be implemented to be in contact with a back surface of the user 10 within the top or the abdominal binder.

According to example embodiments, the matrix module 330 may include a substrate and a plurality of stimulation elements arranged in a 2D matrix structure on the substrate. The substrate may support the stimulation elements and the stimulation elements may make substantial contact with the first body surface 12. For example, each of the stimulation elements may include at least one of an electrode, a vibration motor, and a linearly moving pin module. The electrode may generate the electrical stimulation on the first body surface 12 using voltage or current applied to the electrode. The vibration motor may vibrate according to the applied voltage and may generate the vibration stimulation on the first body surface 12. For example, the vibration motor may be an eccentric rotating mass (ERM) or a linear resonant actuator (LRA). The pin module may linearly move relative to the first body surface 12 and may generate the pressure stimulation on the first body surface 12. For example, the pin module may be implemented to run using a linear servo motor.

The memory 340 may store a variety of data used by at least one component of the tactile output module 120. For example, the memory 340 may include at least one of a volatile memory and a nonvolatile memory. Data may include at least one program and input data or output data related thereto. The program may be stored as software that includes at least one instruction in the memory 340 and may include at least one of an OS middleware, and an application.

The processor 350 may control at least one component of the tactile output module 120 by executing the program of the memory 340. Through this, the processor 350 may perform data processing or operation. Here, the processor 350 may execute the instruction stored in the memory 340.

According to example embodiments, the processor 350 may generate a tactile output for the first body surface 12 of the user 10 through the matrix module 330 based on 2D visual information. Here, a first tactile plane may be defined on the first body surface 12 by the tactile output module 120, in more detail, by the matrix module 330, and the first tactile plane may correspond to a visual plane of the 2D visual information. A size of the first tactile plane may be the same as or different from a size of the visual plane. Here, each of stimulation elements in the first tactile plane may serve as a role of each pixel or each dot and a resolution of the first tactile plane may be defined accordingly. Through this, the processor 350 may generate a tactile stimulation corresponding to at least one object provided on the visual plane in the 2D visual information, on the first tactile plane. That is, the processor 350 may generate the tactile stimulation on the first tactile plane to match at least one of a size, a position, a form, and a feature of each object on the visual plane. To this end, the processor 350 may drive at least one of the stimulation elements of the matrix module 330. That is, the processor 350 may select at least one stimulation element from among the stimulation elements within the first tactile plane based on at least one of a size, a position, a form, and a feature of an object on the visual plane and may generate the tactile stimulation by driving the selected stimulation element.

For example, referring to FIG. 3B, the processor 350 may generate 2D stimulation information based on 2D visual information. Here, the processor 350 may generate the 2D stimulation information by changing a resolution of the 2D visual information received from the electronic device 110 to a predetermined resolution. Here, the resolution of the 2D visual information may be determined based on a size of the visual plane, a resolution of the 2D stimulation information may be determined based on a size of the first tactile plane, and each of the stimulation elements within the first tactile plane may serve as a role of each pixel or each dot. That is, a resolution of the first tactile plane may represent a resolution for the 2D stimulation information. Through this, the processor 350 may select at least one stimulation element from among the stimulation elements within the first tactile plane using the 2D stimulation information and may generate the tactile stimulation by driving the selected stimulation element.

Figure 4:
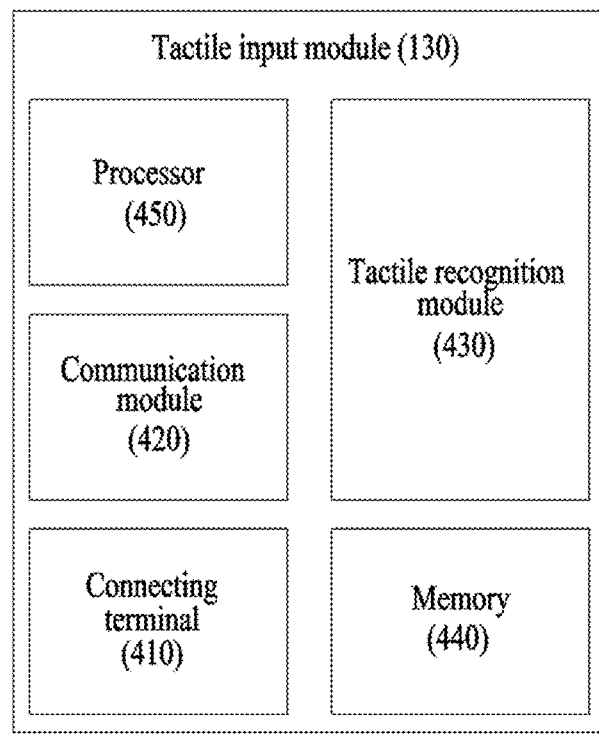
FIG. 4 illustrates an example of a tactile input module of FIG. 1.

FIG. 4 illustrates an example of the tactile input module 130 of the computer system 100 according to example embodiments.

Referring to FIG. 4, the tactile input module 130 may include at least one of a connecting terminal 410, a communication module 420, a tactile recognition module 430, a memory 440, and a processor 450. In some example embodiments, at least one of the components of the tactile input module 130 may be omitted and at least one another component may be added to the tactile input module 130. In some example embodiments, at least two of the components of the tactile input module 130 may be implemented as a single integrated circuitry. According to an example embodiment, the memory 440 and the processor 450 of the tactile input module 130 may be integrated into the memory 250 and the processor 260 of the electronic device 110, respectively. In this case, the communication module 320 may be directly connected to the tactile recognition module 430. According to another example embodiment, the tactile input module 130 may be implemented into a single device with the electronic device 110. In this case, the connecting terminal 410 and the communication module 420 may be omitted from the tactile input module 130, and the memory 440 and the processor 450 of the tactile input module 130 may be integrated into the memory 250 and the processor 260 of the electronic device 110, respectively. According to another example embodiment, the tactile input module 130 may be implemented into a single device with the tactile output module 120. In this case, the connecting terminal 410 and the communication module 420 may be omitted from the tactile input module 130, and the memory 440 and the processor 450 of the tactile input module 130 may be integrated into the memory 340 and the processor 350 of the tactile output module 120, respectively.

The connecting terminal 410 may be provided for a physical connection between the tactile input module 130 and an external device. According to an example embodiment, the connecting terminal 410 may include a connector. For example, the connecting terminal 410 may include an HDMI connector or a USB connector. Here, the external device may include at least one of the electronic device 110 and the tactile output module 120.

The communication module 420 may communicate with the external device in the tactile input module 130. The communication module 420 may establish a communication channel between the tactile input module 130 and the external device and may communicate with the external device through the communication channel. Here, the external device may include at least one of the electronic device 110 and the tactile output module 120. The communication module 420 may include at least one of a wired communication module and a wireless communication module. The wired communication module may be connected to the external device in a wired manner through the connecting terminal 410 and may communicate with the external device in the wired manner. The wireless communication module may include at least one of a near field communication module and a far field communication module. The near field communication module may communicate with the external device through a near field communication scheme. For example, the near field communication scheme may include at least one of Bluetooth, WiFi direct, and IrDA. The far field communication module may communicate with the external device through a far field communication scheme. Here, the far field communication module may communicate with the external device over a network. For example, the network may include at least one of a cellular network, the Internet, and a computer network such as a local area network (LAN) and a wide area network (WAN).

The tactile recognition module 430 may sense a tactile input for the second body surface 13 of the user 10. Here, the tactile recognition module 430 may sense the tactile input based on at least one of a touch input and a hover input from the user 10 for the second body surface 130. To this end, the tactile recognition module 430 may be in contact with at least a portion of the second body surface 13 or may be separate from the second body surface 13.

According to an example embodiment, the tactile recognition module 430 may include a camera, for example, a planar camera and a depth camera, configured to capture an image for the second body surface 13. According to another example embodiment, the tactile recognition module 430 may include an optical tracking module having optical markers configured to attach to the second body surface 13 and a finger of the user 10 or a tool, for example, a stylus, for generating a tactile input for the second body surface 13. According to another example embodiment, the tactile recognition module 430 may include a touch sensing module configured to attach to the second body surface 13. For example, when the tactile input module 130 is implemented in a form of a glove, the tactile recognition module 430 may be provided to be adjacent to the dorsal surface of the hand of the user 10 within the glove. According to another example embodiment, the tactile recognition module 430 may include a sensor module that includes a position sensor and a pressure sensor. For example, the position sensor may include a transmitter and at least three receivers. As another example, the pressure sensor may be implemented using a force sensitive resistor (FSR).

The memory 440 may store a variety of data used by at least one component of the tactile input module 130. For example, the memory 440 may include at least one of a volatile memory and a non-volatile memory. Data may include at least one program and input data or output data related thereto. The program may be stored as software that includes at least one instruction in the memory 440 and may include at least one of an OS middleware, and an application.

The processor 450 may control at least one component of the tactile input module 130 by executing the program of the memory 440. Through this, the processor 450 may perform data processing or operation. Here, the processor 450 may execute the instruction stored in the memory 440.

According to example embodiments, the processor 450 may sense a tactile input for the second body surface 13 of the user 10 through the tactile recognition module 430. For example, the tactile input may include at least one of a single touch, a single hover, a multi-touch, and a multi-hover. Here, a second tactile plane may be defined on the second body surface 13 by the tactile input module 130, in more detail, by the tactile recognition module 430, and the second tactile plane may correspond to the first tactile plane. A size of the second tactile plane may be the same as a size of the first tactile plane, but may not be limited thereto. Here, a resolution of the second tactile plane may be defined as the same as a resolution of the first tactile plane. The second tactile plane and the first tactile plane may be coplanar or may be individually present to be separate from each other. Through this, the processor 450 may sense a tactile input on the second tactile plane. The processor 450 may generate tactile information about the tactile input and may provide the tactile information to the electronic device 110. Here, the tactile information may include at least one of a touch status on the second body surface 13, that is, identification information about a touch or a hover, at least one touch position on the second tactile plane, and at least one hover position on the second tactile plane.

According to an example embodiment, when the tactile recognition module 430 includes a camera, the processor 450 may sense a tactile input through a boundary analysis in an image captured by the camera. For example, when the tactile recognition module 430 includes a planar camera, the processor 450 may detect a touch position or a hover position and a touch status from a change in a position of a finger of the user 10 or a tool relative to the second body surface 13. Additionally, the processor 450 may more accurately detect a touch position or a hover position and a touch status from a change in a fingertip or a nail of the user 10. As another example, when the tactile recognition module 430 includes a depth camera, the processor 450 may detect a touch position or a hover position and a touch status from a position and a depth of a finger of the user 10 or a tool relative to the second body surface 13.

According to another example embodiment, when the tactile recognition module 430 includes an optical tracking module, optical markers of the optical tracking module may be attached to an end portion of a finger of the user 10 or a tool and the second body surface 13 or the matrix module 330 of the tactile output module 120. Through this, the processor 450 may detect a touch position or a hover position and a touch status from a change in a relative position of the end portion of the finger of the user 10 or the tool relative to the second body surface 13 or the matrix module 330.

According to another example embodiment, when the tactile recognition module 430 includes a touch sensing module, the processor 450 may detect a touch position or a hover position and a touch status from an electrical change in the touch sensing module.

According to another example embodiment, when the tactile recognition module 430 includes a sensor module that includes a position sensor or a pressure sensor, a transmitter of the position sensor and the pressure sensor may be attached at an end portion of the finger of the user 10 or a tool and receivers of the position sensor may be distributed and arranged to the second body surface 13 or the matrix module 330. Through this, the processor 450 may detect a touch position or a hover position from a position of the transmitter by detecting a touch status through the pressure sensor and by detecting a position of the transmitter through a triangulation scheme using positions of the receivers.

FIGS. 5A, 5B, 5C, 5D, 5E, 5F, 5G, and 5H illustrate examples of an operation characteristic of the computer system 100 according to example embodiments. Here, description is made based on an example in which the first body surface 12 is a palmar surface of a hand and the second body surface 13 is a dorsal surface of the hand. However, it is provided as an example only.

Referring to FIGS. 5A, 5B, 5C, 5D, 5E, 5F, 5G, and 5H, the computer system 100 according to example embodiments may provide a tactile interface for a real-time 2D tactile input/output interaction of the user 10, for example, a visually impaired person. To this end, the user 10 may place a desired body portion relative to the computer system 100. Here, the first body surface 12 may be in contact with the tactile output module 120 and, corresponding thereto, the tactile input module 130 may be provided for the second body surface 13. Here, although an example in which the first body surface 12 is a palmar surface of a hand and the second body surface 13 is a dorsal surface of the hand is illustrated, it is provided as an example only. That is, the example embodiment may apply even in a case in which the first body surface 12 is a sole surface of a foot and the second body surface 13 is a top surface of the foot or a case in which the first body surface 12 is a back surface and the second body surface 13 is an abdominal surface.

In detail, the tactile output module 120 may generate a tactile output 521 for the first body surface 12 of the user 10 based on 2D visual information 500 from the electronic device 110. That is, the tactile output module 120 may generate the tactile output 521 on a first tactile plane 520 to match each object 511 on a visual plane 510. Through this, in response to the tactile output 521, the user 10 may generate a tactile input 531 for the tactile input module 130 and the tactile input module 130 may sense the tactile input 531. Therefore, the electronic device 110 may control the 2D visual information 500 based on the tactile input 531.

Figure 5A:
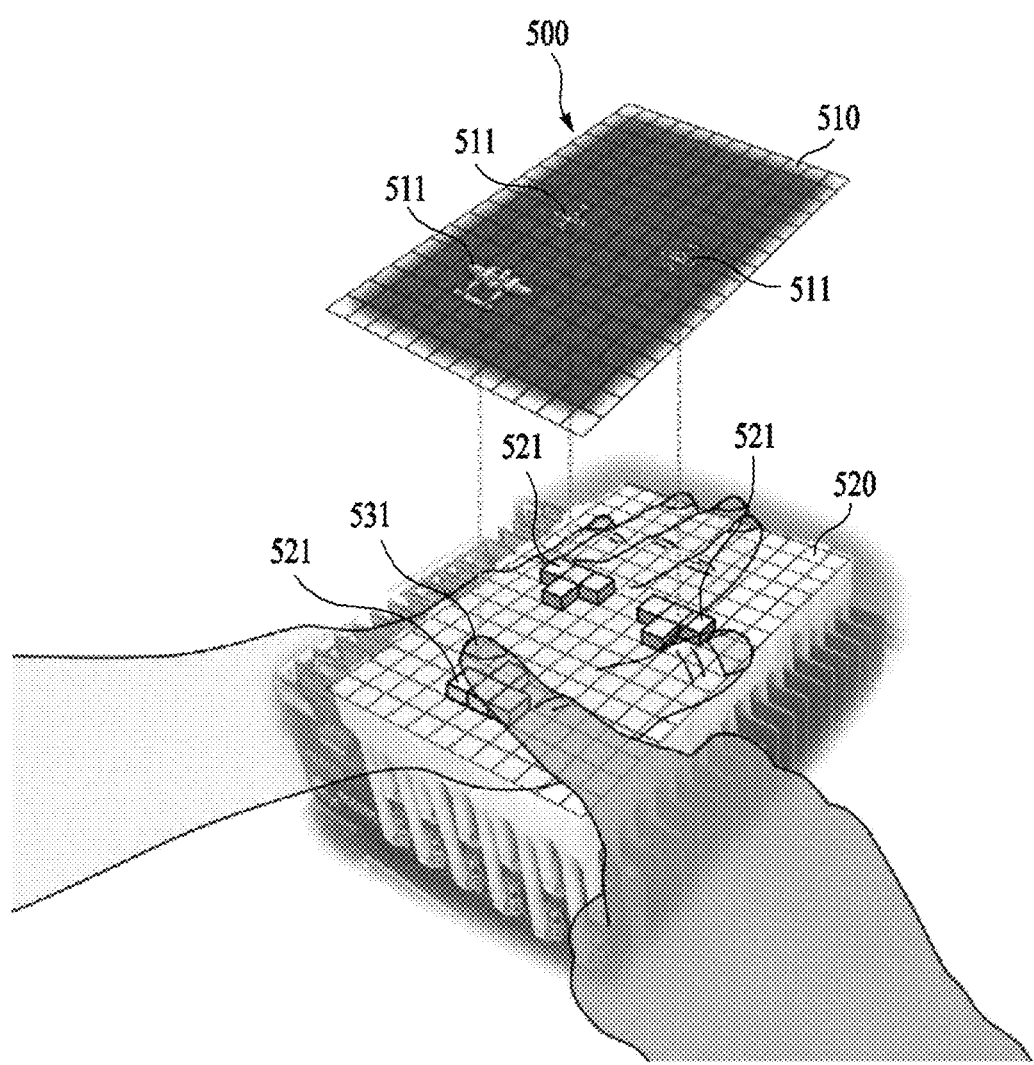
Figure 5B:
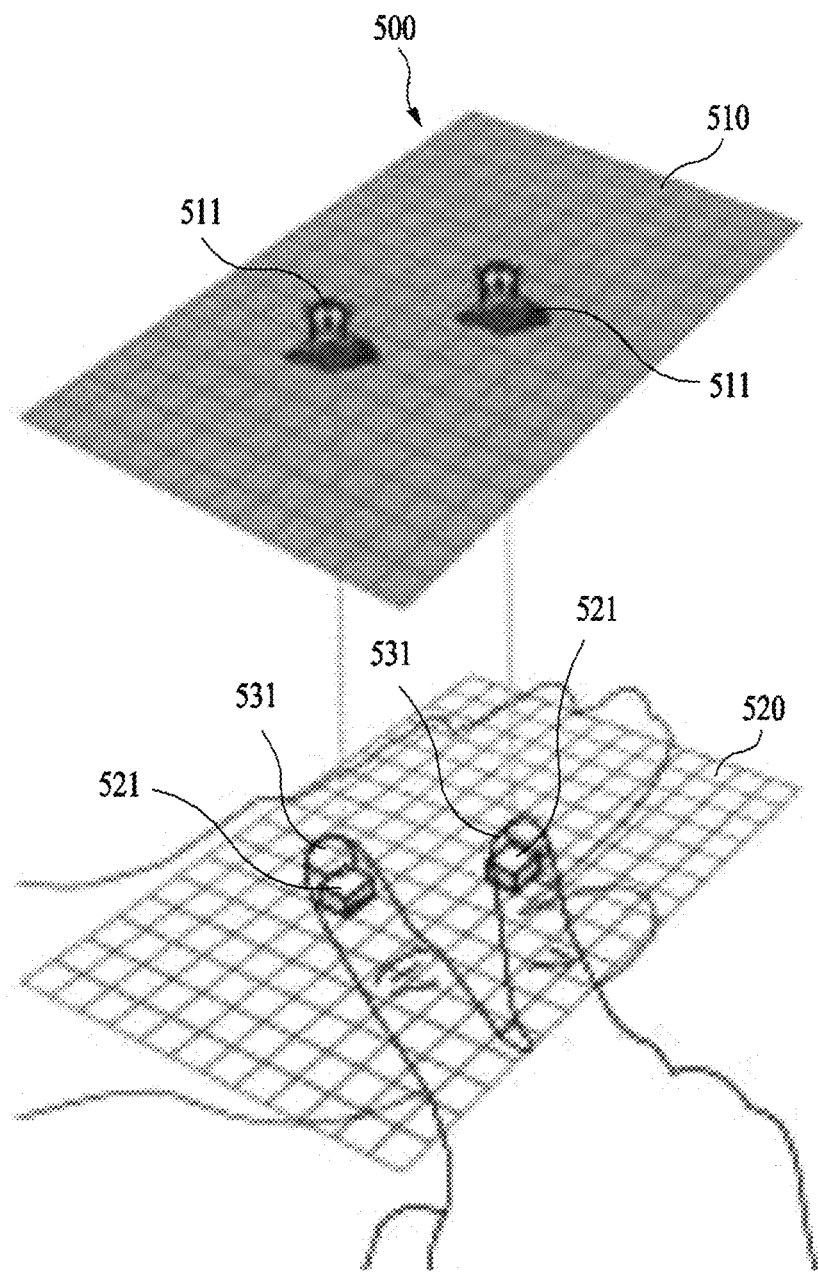
Figure 5C:
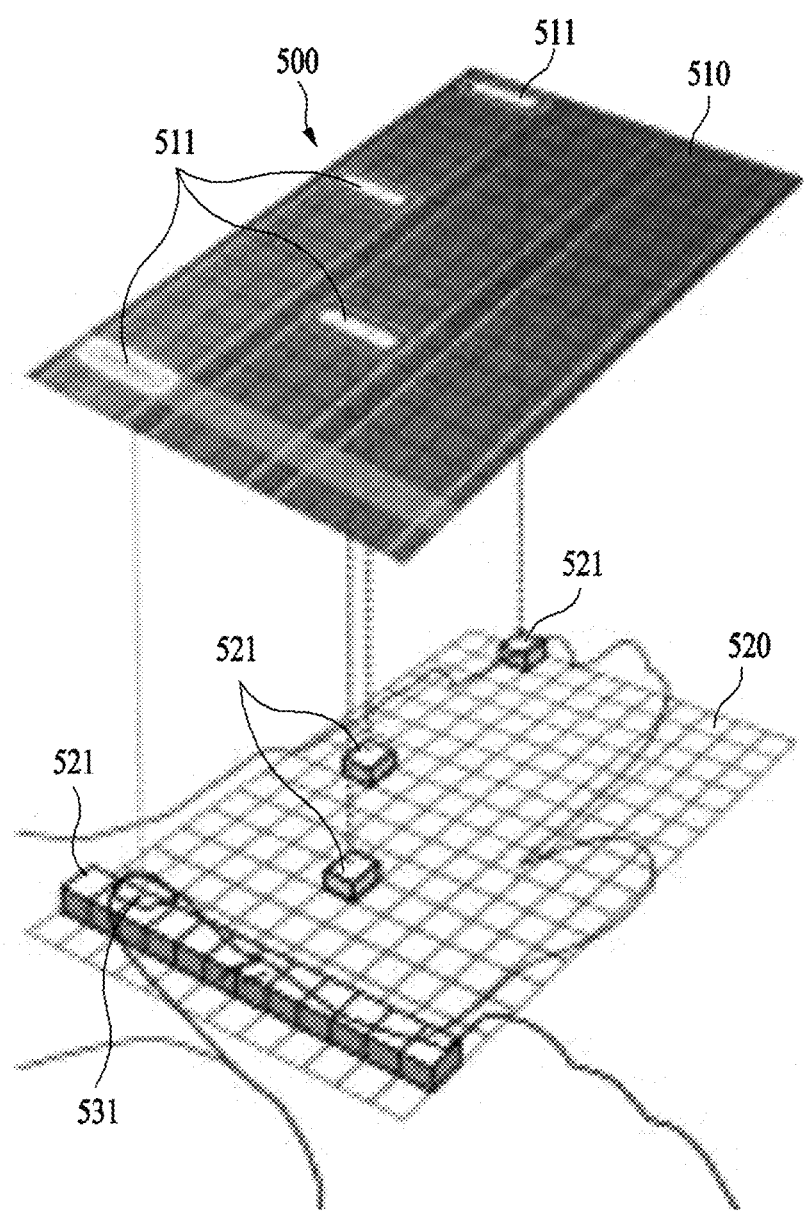
Figure 5D:
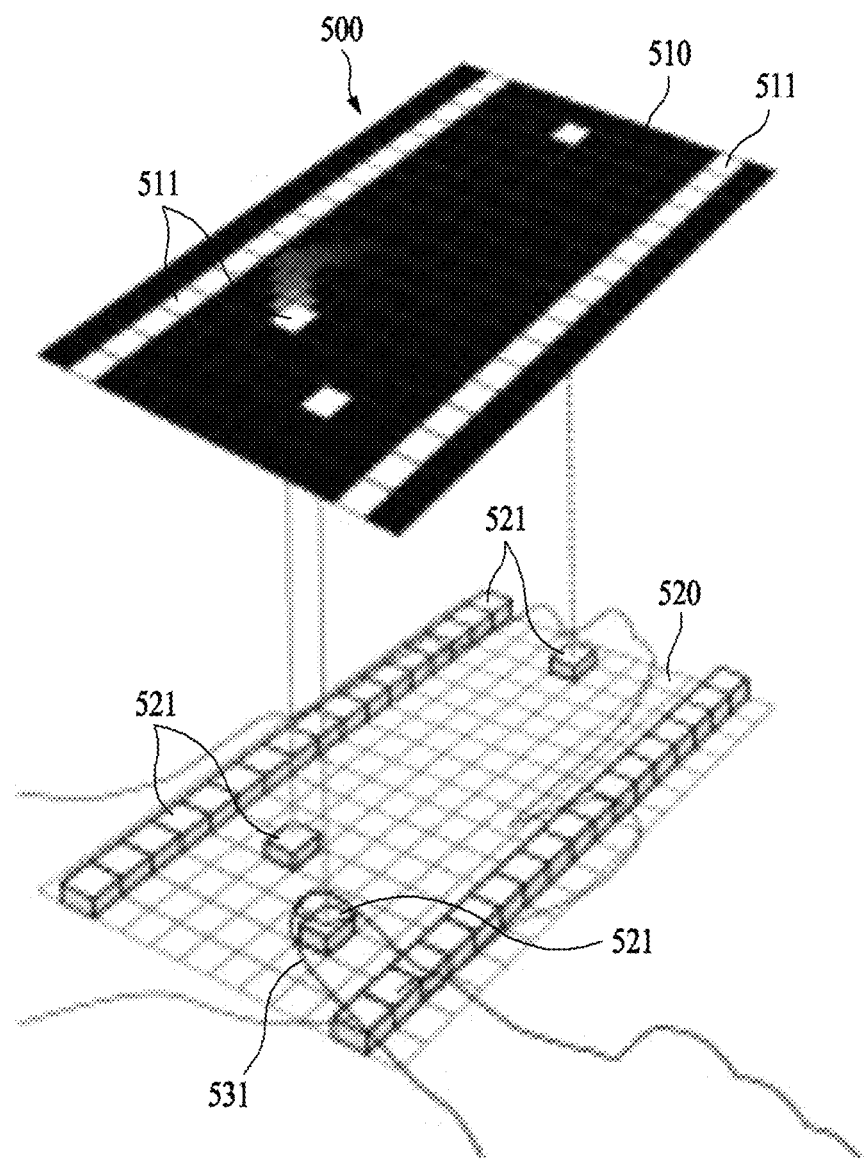
Figure 5E:
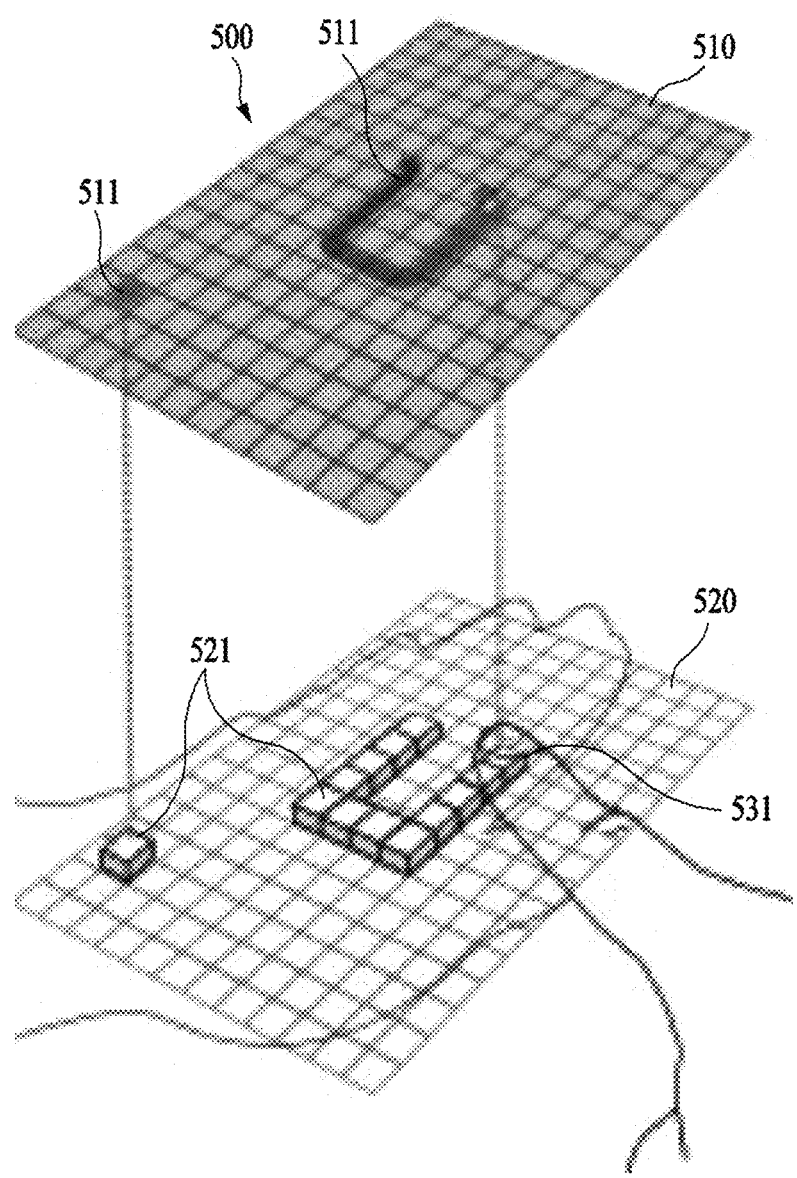

For example, referring to FIG. 5A, 5B, 5C, 5D, or 5E, the tactile output module 120 may generate the tactile output 521 corresponding to the object 511 associated with an item in a game based on the 2D visual information 500 related to the game. Through this, the tactile input module 130 may sense the tactile input 531 for controlling the object 511 from the user 10 and the electronic device 110 may control the 2D visual information 510 based on the tactile input 531. Referring to FIG. 5A, for a real-time airplane shooting game, the tactile output module 120 may generate the tactile output 521 corresponding to a form and a direction of each of airplanes and the electronic device 110 may control at least one of the airplanes based on the tactile input 531 sensed through the tactile input module 130. Referring to FIG. 5B, for a mole multi-touch game, the tactile output module 120 may generate the tactile output 521 corresponding to moles and the electronic device 110 may select moles based on the tactile input 531 sensed through the tactile input module 130. Referring to FIG. 5C, for a rhythm game of selecting bars descending according to music at an appropriate timing, the tactile output module 120 may generate the tactile output 521 corresponding to bars and the electronic device 110 may select at least one of the bars based on the tactile input 531 sensed through the tactile input module 130. Referring to FIG. 5D, for a multi-player game of bouncing a ball to a goal of an opponent, the tactile output module 120 may generate the tactile output 521 corresponding to balls and the electronic device 110 may bounce at least one of the balls based on the tactile input 531 sensed through the tactile input module 130. Referring to FIG. 5E, for a snake game of acquiring a target by manipulating a snake of which shape changes, the tactile output module 120 may generate the tactile output 521 corresponding to the snake and the target and the electronic device 110 may move the snake while changing the shape of the snake based on the tactile input 531 sensed through the tactile input module 130.

Figure 5H:
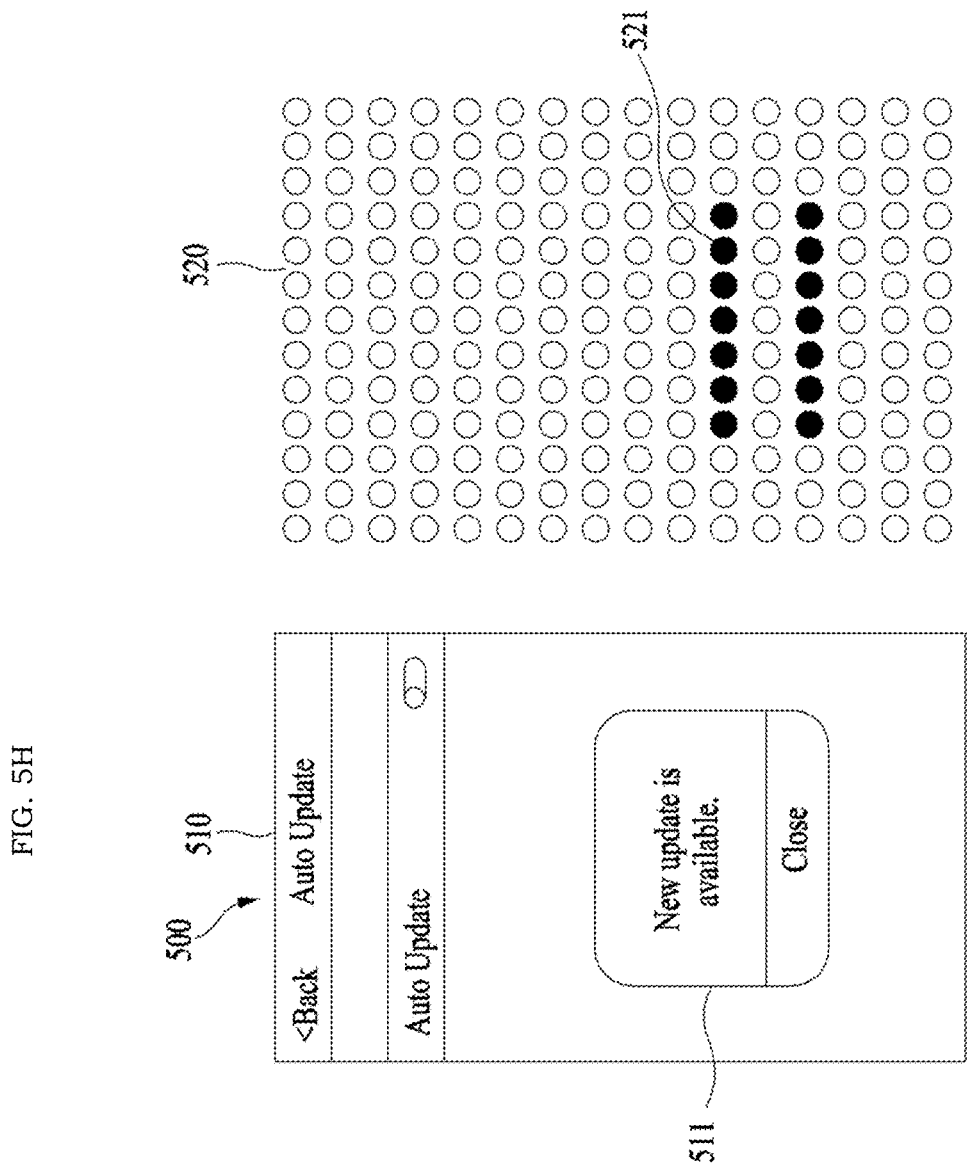

As another example, referring to FIGS. 5F, 5G, and 5H, the tactile output module 120 may generate the tactile output 521 corresponding to the object 511 in a display screen based on the 2D visual information 500 related to the display screen of the electronic device 110. Through this, the tactile input module 130 may sense the tactile input 531 for controlling the object 511 from the user 10 and the electronic device 110 may control the 2D visual information 510 based on the tactile input 531. Referring to FIG. 5F, when a plurality of icons and widgets are displayed on the display screen, the tactile output module 120 may generate the tactile output 521 corresponding to the icons and the widgets. Subsequently, the electronic device 110 may select one of the icons and the widgets based on a tactile input 531 sensed through the tactile input module 130 and may execute a function assigned thereto. Referring to FIG. 5G, when at least one of items, texts, buttons, and sliders are displayed on the display screen, the tactile output module 120 may generate the tactile output 521 corresponding to at least one of the items, the texts, the buttons, and the sliders. The electronic device 110 may select one of the items, the buttons, and the sliders based on a tactile input 531 sensed through the tactile input module 130, may execute a function assigned thereto or may select the texts and may convert the texts to audio signals and play back the converted audio signals. Referring to FIG. 5H, when a pop-up window is displayed on the display screen, the tactile output module 120 may generate the tactile output 521 corresponding to the pop-up window. The electronic device 110 may convert texts in the pop-up window to audio signals based on a tactile input 531 sensed through the tactile input module 130 and play back the converted audio signals or may remove the pop-up window.

Figure 6:
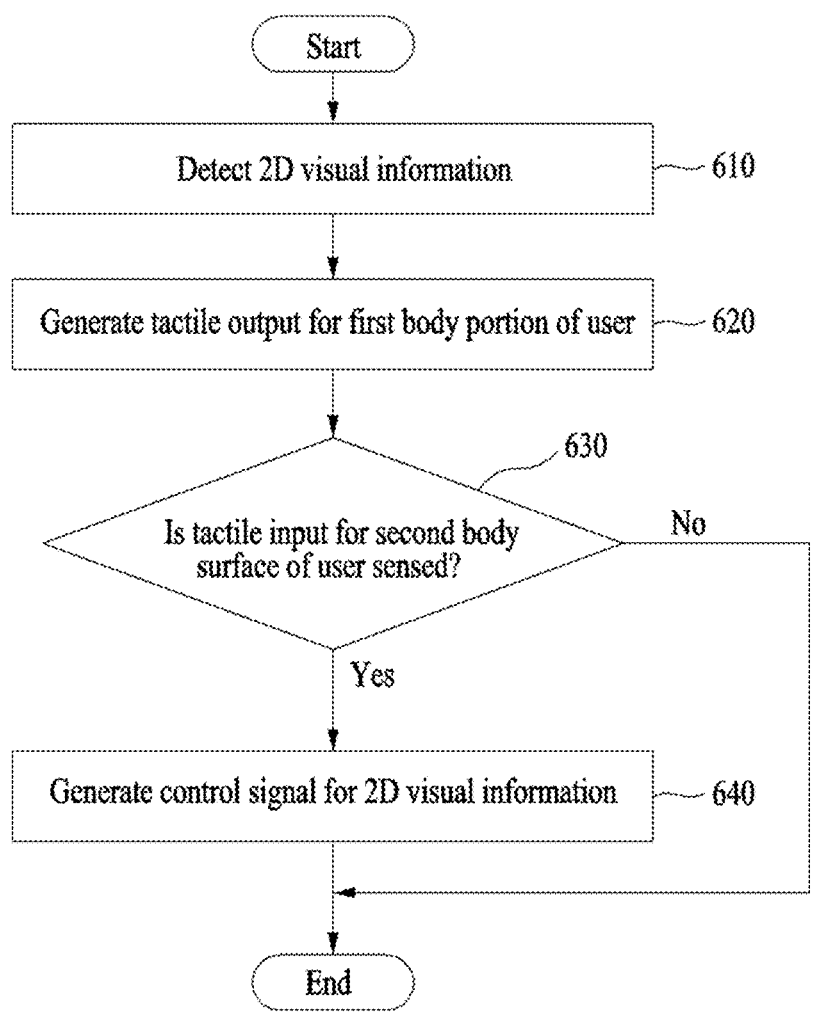
FIG. 6 is a flowchart illustrating an example of an operating method of a computer system according to example embodiments.

FIG. 6 is a flowchart illustrating an example of an operating method of the computer system 100 according to example embodiments.

Referring to FIG. 6, in operation 610, the computer system 100 may detect 2D visual information. In detail, the electronic device 110 may manage the 2D visual information. Here, the 2D visual information may include at least one object provided on a predetermined visual plane. For example, the visual plane may represent a background screen and the object may include at least one of an icon, a widget, an item, a character, a button, a slider, and a pop-up window as a screen element provided on the background screen. The electronic device 110, that is, the processor 260 may provide the 2D visual information to the tactile output module 120. To this end, the processor 260 may generate the 2D visual information at a preset resolution. For example, the processor 260 may provide the 2D visual information to the tactile output module 120 while displaying the 2D visual information.

In operation 620, the computer system 100 may generate a tactile output for the first body surface 12 of the user 10. In detail, the tactile output module 120 may generate the tactile output for the first body surface 12 of the user 10 based on the 2D visual information. Here, a first tactile plane may be defined on the first body surface 12 by the tactile output module 120 and the first tactile plane may correspond to the visual plane of the 2D visual information. A size of the first tactile plane may be the same as or different from a size of the visual plane. Here, each of stimulation elements in the first tactile plane may serve as a role of each pixel or each dot and a resolution of the first tactile plane may be defined accordingly. Through this, the tactile output module 120 may generate a tactile stimulation corresponding to at least one object provided on a visual plane in the 2D visual information, on the first tactile plane. That is, the tactile output module 120 may generate a tactile stimulation on the first tactile plane to match at least one of a size, a position, a form, and a feature of each object on the visual plane. To this end, in the tactile output module 120, the processor 350 may drive at least one of the stimulation elements of the matrix module 330. That is, the processor 350 may select at least one stimulation element from among the stimulation elements within the first tactile plane based on at least one of a size, a position, a form, and a feature of an object on the visual plane, and may generate the tactile stimulation by driving the selected stimulation element.

In operation 630, the computer system 100 may sense a tactile input for the second body surface 13 of the user 10. In detail, the tactile input module 130 may sense the tactile input for the second body surface 13 of the user 10. For example, the tactile input may include at least one of a single touch, a single hover, a multi-touch, and a multi-hover. Here, a second tactile plane may be defined on the second body surface 13 by the tactile input module 130 and the second tactile plane may correspond to the first tactile plane. A size of the second tactile plane may be the same as a size of the first tactile plane, but may not be limited thereto. Here, a resolution of the second tactile plane may be defined as the same as a resolution of the first tactile plane. The second tactile plane and the first tactile plane may be coplanar or may be individually present to be separate from each other. Through this, the tactile input module 130 may sense a tactile input on the second tactile plane. The tactile input module 130 may generate tactile information about the tactile input and may provide the tactile information to the electronic device 110. Here, the tactile information may include at least one of a touch status on the second body surface 13, that is, identification information about a touch or a hover, at least one touch position on the second tactile plane, and at least one hover position on the second tactile plane.

In operation 640, the computer system 100 may generate a control signal for the 2D visual information. In detail, the electronic device 110 may generate the control signal for the 2D visual information based on the tactile input. For example, the electronic device 110 may receive tactile information about the tactile input from the tactile input module 130 and may generate the control signal using the tactile information. The electronic device 110 may control the 2D visual information according to the control signal. Through this, the electronic device 110 may modify the 2D visual information.

Once the 2D visual information is modified, the computer system 100 may restart the method and may return to operation 610. That is, when the 2D visual information is modified according to the control signal generated based on the tactile input in operation 640, the computer system 100 may restart the method and may repeatedly perform operations 610 to 640. Meanwhile, when the 2D visual information is modified even without detecting the tactile input in operation 630, the computer system 100 may restart the method and may repeatedly perform operations 610 to 640. Therefore, for the 2D visual information that varies in real time, the computer system 100 may provide a tactile interface for a real-time 2D tactile input/output interaction.

According to example embodiments, the computer system 100 may provide a tactile interface for a real-time 2D tactile input/output interaction of the user 10, for example, a visually impaired person. The computer system 100 may generate the 2D visual information by replacing the 2D visual information with a tactile output, that is, a tactile stimulation on a 2D plane, such that the user 10 may recognize the 2D visual information as a whole at once. Here, the computer system 100 may change the tactile output in real time in response to a real-time change in the 2D time visual information. Through this, the user 10 may immediately recognize an object that varies in real time, for example, a moving object. In addition, the computer system 100 may sense a tactile input corresponding to the tactile output and accordingly, allow the user 10 to perform a tactile input/output interaction in real time. Here, the user 10 may cognitively perform a tactile input/output interaction through body surfaces that spatially correspond to each other, for example, a palmar surface and a dorsal surface of a hand, a sole surface and a top surface of a foot, and a back surface and an abdominal surface.

Example embodiments provide an operating method of the computer system 100 that provides a tactile interface.

According to example embodiments, the operating method of the computer system 100 may include generating a tactile output corresponding to 2D visual information for the first body surface 12 of the user 10 through the tactile output module 120 that is in contact with the first body surface 12; sensing a tactile input for the second body surface 13 of the user 10 through the tactile input module 130; and generating a control signal for the 2D visual information based on the tactile input.

According to example embodiments, one of the first body surface 12 and the second body surface 13 may be a ventral surface of one body portion of the user 10, and the other one of the first surface 12 and the second body surface 13 may be a dorsal surface corresponding to the ventral surface in the one body portion.

According to example embodiments, the 2D visual information may include at least one object provided on a predetermined visual plane.

According to example embodiments, the generating of the tactile output may include generating a tactile stimulation corresponding to the object on a first tactile plane that is defined on the first body surface 12 by the tactile output module 120 and corresponds to the visual plane 12.

According to example embodiments, the tactile output module 120 may include a plurality of stimulation elements arranged in a 2D matrix structure on the first tactile plane.

According to example embodiments, the generating of the tactile stimulation may include generating the tactile stimulation by driving at least one of the stimulation elements.

According to example embodiments, each of the stimulation elements may include at least one of an electrode, a vibration motor, and a linearly moving pin module.

According to example embodiments, the generating of the tactile stimulation may include selecting at least one simulation element from among the stimulation elements based on at least one of a size, a position, a form, and a feature of the object on the visual plane; and generating the tactile stimulation by driving the selected stimulation element.

According to example embodiments, the control signal may include a signal for controlling the object on the visual plane.

According to example embodiments, the sensing of the tactile input may include sensing the tactile input on the second tactile plane 13 that is defined on the second body surface by the tactile input module 130 and corresponds to the first tactile plane.

According to example embodiments, the tactile input may include at least one of a touch status on the second body surface 13, at least one touch position on the second tactile plane, and at least one hover position on the second tactile plane.

According to example embodiments, the tactile input module 130 may include at least one of a planar camera, a depth camera, an optical tracking module having optical markers, a touch sensing module, a position sensor, and a pressure sensor.

Example embodiments provide the computer system 100 that provides a tactile interface, the computer system 100 including the tactile output module 120 configured to be in contact with the first body surface 12 of the user 10 and to generate a tactile output corresponding to 2D visual information for the first body surface 12; the tactile input module 130 configured to sense a tactile input for the second body surface 13 of the user 10; and the processor 260 configured to generate a control signal for the 2D visual information based on the tactile input.

According to example embodiments, one of the first body surface 12 and the second body surface 13 may be a ventral surface of one body portion of the user 10, and the other one of the first surface 12 and the second body surface 13 may be a dorsal surface corresponding to the ventral surface in the one body portion.

According to example embodiments, the 2D visual information may include at least one object disposed on a predetermined visual plane.

According to example embodiments, the tactile output module 120 may be configured to generate a tactile stimulation corresponding to the object on a first tactile plane that is defined on the first body surface 12 by the tactile output module 120 and corresponds to the visual plane 12.

According to example embodiments, the tactile output module 120 may include a plurality of stimulation elements arranged in a 2D matrix structure on the first tactile plane, and may be configured to generate the tactile stimulation by driving at least one of the stimulation elements.

According to example embodiments, each of the stimulation elements may include at least one of an electrode, a vibration motor, and a linearly moving pin module.

According to example embodiments, the tactile output module 120 may be configured to select at least one stimulation element from among the stimulation elements based on at least one of a size, a position, a form, and a feature of the object on the visual plane, and to generate the tactile stimulation by driving the selected stimulation element.

According to example embodiments, the control signal may include a signal for controlling the object on the visual plane.

According to example embodiments, the tactile input module 130 may be configured to sense the tactile input on a second tactile plane that is defined on the second body surface 13 by the tactile input module 130 and corresponds to the first tactile plane.

According to example embodiments, the tactile input may include at least one of a touch status on the second body surface 13, at least one touch position on the second tactile plane, and at least one hover position on the second tactile plane.

According to example embodiments, the tactile input module 130 may include at least one of a planar camera, a depth camera, an optical tracking module having optical markers, a touch sensing module, a position sensor, and a pressure sensor.

The systems and/or apparatuses described herein may be implemented using hardware components, software components, and/or a combination thereof. For example, a processing device and components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. Here, the media may be to continuously store a computer-executable program or to temporarily store the same for execution or download. Also, the media may include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of program instructions include both machine code, such as produced by a compiler, and files containing higher level code that may be executed by the computer using an interpreter.

The terms used herein are used to explain specific embodiments and are not construed to limit the disclosure and should be understood to include various modifications, equivalents, and/or substitutions of the example embodiments. In the drawings, like reference numerals refer to like components throughout the present specification. The singular forms "a," "an," and "the" are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe various components and the components should not be limited by the terms. The terms are simply used to distinguish one component from another component. When a component, for example, a first component, is described to be "(functionally or communicatively) connected to" or "accessed to" another component, for example, a second component, the component may be directly connected to the other component or may be connected through still another component, for example, a third component.

The term "module" used herein may include a unit configured as hardware, software, or firmware, and may be interchangeably used with the terms "logic," "logic block," "part," "circuit," etc. The module may be an integrally configured part, a minimum unit that performs at least function, or a portion thereof. For example, the module may be configured as an application-specific integrated circuit (ASIC).

According to the example embodiments, each of the components (e.g., module or program) may include a singular object or a plurality of objects. According to the example embodiments, at least one of the components or operations may be omitted. Alternatively, at least one another component or operation may be added. Alternatively or additionally, a plurality of components (e.g., module or program) may be integrated into a single component. In this case, the integrated component may perform one or more functions of each of the components in the same or similar manner as it is performed by a corresponding component before integration. According to the example embodiments, operations performed by a module, a program, or another component may be performed in a sequential, parallel, iterative, or heuristic manner. Alternatively, at least one of the operations may be performed in different sequence or omitted. Alternatively, at least one another operation may be added.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An operating method of a computer system that provides a tactile interface, the method comprising:
generating a tactile output corresponding to two-dimensional (2D) visual information for a first body surface of a user through a tactile output module that is in contact with the first body surface to define a first tactile plane on the first body surface;
defining a second tactile plane on a second body surface that corresponds spatially to the first body surface, the second tactile plane having tactile input locations corresponding spatially to tactile output locations on the first tactile plane on the first body surface;
sensing a tactile input for the second body surface of the user through the tactile input module; and
generating a control signal for the 2D visual information based on the tactile input.

2. The method of claim 1, wherein one of the first body surface and the second body surface is a ventral surface of one body portion of the user, and
wherein the other one of the first surface and the second body surface is a dorsal surface corresponding to the ventral surface in the one body portion.

3. The method of claim 1, wherein the 2D visual information includes at least one object provided on a predetermined visual plane, and
wherein the generating of the tactile output comprises generating a tactile stimulation corresponding to the object on the first tactile plane that is defined on the first body surface by the tactile output module and corresponds to the visual plane.

4. The method of claim 3, wherein the tactile output module includes a plurality of stimulation elements arranged in a 2D matrix structure on the first tactile plane, and
wherein the generating of the tactile stimulation generates the tactile stimulation by driving at least one of the stimulation elements.

5. The method of claim 4, wherein each of the stimulation elements includes at least one of an electrode, a vibration motor, and a linearly moving pin module.

6. The method of claim 4, wherein the generating of the tactile stimulation comprises:
selecting at least one stimulation element from among the stimulation elements based on at least one of a size, a position, a form, and a feature of the object on the visual plane; and
generating the tactile stimulation by driving the selected stimulation element.

7. The method of claim 3, wherein the control signal includes a signal for controlling the object on the visual plane.

8. The method of claim 3, wherein the sensing of the tactile input comprises sensing the tactile input on the second tactile plane that is defined on the second body surface by the tactile input module and corresponds to the first tactile plane.

9. The method of claim 8, wherein the tactile input includes at least one of a touch status on the second body surface, at least one touch position on the second tactile plane, and at least one hover position on the second tactile plane.

10. The method of claim 8, wherein the tactile input module includes at least one of a planar camera, a depth camera, an optical tracking module having optical markers, a touch sensing module, a position sensor, and a pressure sensor.

11. A computer system that provides a tactile interface, the computer system comprising:
a tactile output module configured to be in contact with a first body surface of a user and to generate a tactile output corresponding to two-dimensional (2D) visual information for the first body surface and define a first tactile plane on the first body surface;
a tactile input module configured to define a second tactile plane on a second body surface that corresponds spatially to the first body surface, the second tactile plane having tactile input locations corresponding spatially to tactile output locations on the first tactile plane on the first body surface and sense a tactile input for a second body surface of the user; and
a processor configured to generate a control signal for the 2D visual information based on the tactile input.

12. The computer system of claim 11, wherein one of the first body surface and the second body surface is a ventral surface of one body portion of the user, and
wherein the other one of the first body surface and the second body surface is a dorsal surface corresponding to the ventral surface in the one body portion.

13. The computer system of claim 11, wherein the 2D visual information includes at least one object provided on a predetermined visual plane, and
wherein the tactile output module is configured to generate a tactile stimulation corresponding to the object on the first tactile plane that is defined on the first body surface by the tactile output module and corresponds to the visual plane.

14. The computer system of claim 13, wherein the tactile output module includes a plurality of stimulation elements arranged in a 2D matrix structure on the first tactile plane, and is configured to generate the tactile stimulation by driving at least one of the stimulation elements.

15. The computer system of claim 14, wherein each of the stimulation elements includes at least one of an electrode, a vibration motor, and a linearly moving pin module.

16. The computer system of claim 14, wherein the tactile output module is configured to select at least one stimulation element from among the stimulation elements based on at least one of a size, a position, a form, and a feature of the object on the visual plane, and to generate the tactile stimulation by driving the selected stimulation element.

17. The computer system of claim 13, wherein the control signal includes a signal for controlling the object on the visual plane.

18. The computer system of claim 13, wherein the tactile input module is configured to sense the tactile input on the second tactile plane that is defined on the second body surface by the tactile input module and corresponds to the first tactile plane.

19. The computer system of claim 18, wherein the tactile input includes at least one of a touch status on the second body surface, at least one touch position on the second tactile plane, and at least one hover position on the second tactile plane.

20. The computer system of claim 18, wherein the tactile input module includes at least one of a planar camera, a depth camera, an optical tracking module having optical markers, a touch sensing module, a position sensor, and a pressure sensor.

* * * * *